United States Patent Office 3,252,861

Patented May 24, 1966

3,252,861

ANTIHYPERTENSIVE CINNAMYL GUANIDINE COMPOSITIONS

Robert Paul Mull, Florham Park, N.J., assignor to Ciba Corporation, New York, N.Y., a corporation of Delaware No Drawing. Filed Nov. 7, 1963, Ser. No. 322,018
8 Claims. (Cl. 167—65)

This is a continuation-in-part application of my Serial No. 271,866, filed April 10, 1963, which in turn is a continuation-in-part application of my application Serial No. 205,083 filed June 25, 1962, both now abandoned.

The present invention concerns guanidine compounds. Particularly, it relates to compounds of the formula

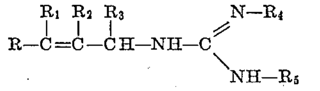

in which R stands for carbocyclic aryl, and each of the groups $R_1$, $R_2$, $R_3$, $R_4$ and $R_5$ is hydrogen or lower alkyl, or acid addition salts thereof, as well as process for the preparation of these compounds.

The carbocyclic group R is more especially monocyclic carbocyclic aryl, above all phenyl, as well as substituted phenyl; the latter may have one or more than one of the same or of different substituents attached at any of the positions available for substitution. Suitable substituents are, for example, lower alkyl, e.g., methyl, ethyl and the like, trifluoromethyl, etherified hydroxyl, especially lower alkoxy, e.g., methoxy, ethoxy, isopropyloxy, n-butyloxy and the like, as well as lower alkenyloxy, e.g., allyloxy and the like, or lower alkylenedioxy, e.g., methylenedioxy and the like, esterified hydroxyl, especially halogeno (representing hydroxyl esterified by hydrohalic acid), e.g., fluoro, chloro, bromo and the like, as well as lower alkoxy-carbonyloxy, e.g., methoxy-carbonyloxy, ethoxy-carbonyloxy and the like, or lower alkanoyloxy, e.g., acetyloxy, propionyloxy and the like, acyl, such as lower alkanoyl, e.g., acetyl, propionyl and the like, etherified mercapto, such as lower alkylmercapto, e.g., methylmercapto, ethylmercapto and the like, nitro, amino, preferably N,N-disubstituted amino, for example, N,N-di-lower alkyl-amino, e.g., N,N-dimethylamino and the like. Substituted phenyl groups are more specifically represented by (lower alkyl)-phenyl, (trifluoromethyl)-phenyl, (lower alkoxy)-phenyl, (lower alkenyloxy)-phenyl, (lower alkylenedioxy)-phenyl, (lower alkoxy-carbonyloxy)-phenyl, (lower alkanoyloxy)-phenyl, (halogeno)-phenyl, (lower alkanoyl)-phenyl, (lower alkylmercapto)-phenyl, (nitro)-phenyl, or (N,N-di-lower alkyl-amino)-phenyl and the like. Other carbocyclic aryl radicals representing the group R in the above formula, are bicyclic carbocyclic aryl radicals, such as naphthyl, i.e., 1-naphthyl or 2-naphthyl, or substituted naphthyl, in which the bicyclic carbocyclic aryl portion is substituted by one or more than one of the same or of different substituents, such as those mentioned above, which may be attached to any of the positions available for substitution.

The groups $R_1$, $R_2$, $R_3$, $R_4$ and $R_5$ stand primarily for hydrogen, but may also be lower alkyl, having preferably from one to four carbon atoms, particularly methyl, as well as ethyl, n-propyl, isopropyl, n-butyl, isobutyl, secondary butyl, tertiary butyl and the like.

Salts of the compounds of this invention are acid addition salts, primarily pharmaceutically acceptable, non-toxic addition salts with pharmaceutically acceptable acids, particularly inorganic acids, e.g., hydrochloric, hydrobromic, nitric, sulfuric, phosphoric acids and the like, or organic acids, such as organic carboxylic acids, e.g., acetic, malonic, succinic, maleic, hydroxymaleic, fumaric, malic, tartaric, citric, benzoic, nicotinic, isonicotinic acid and the lke, or organic sulfonic acids, e.g., methane sulfonic, ethane sulfonic, 2-hydroxyethane sulfonic, ethane 1,2-disulfonic, p-toluene sulfonic, naphthalene 2-sulfonic acid and the like. Acid addition salts may also serve as intermediates, for example, in the purification or preparation of other acid addition salts, or for identification and characterization purposes. Particularly useful for the latter are salts with acidic organic nitro compounds, e.g., picric, picrolonic, flavianic acid and the like, or with metal complex acids, e.g., phosphotungstic, phosphomolybdic, chloroplatinic, Reinecke acid and the like.

The compounds of this invention may be in the form of mixtures of isomers or of single isomers. Thus, they are preferably in the form of their geometric cis-isomers and trans-isomers.

The compounds of this invention have strong antihypertensive properties, which are of quick onset and considerable duration; they are, therefore, useful as antitypertensive agents capable of lowering the blood pressure in hypertensive conditions.

The compounds of this invention are also useful as research tools which affect the pathways of the sympathetic nerve system. Thus, when given orally to anesthetized dogs in pharmacological experiments, they block the pressor effects of amphetamine, potentiate the pressor effects of norepinephrine and block the carotid occlusion pressor reflex; however, unlike other compounds with a similar pattern of pharmacological properties, they do not cause a relaxation of the nictitating membrane. In a different pharmacological experiment, in which a smaller amount of the test substance is administered into the small intestine of an anesthetized dog, it has been found that the compounds of this invention antagonize the pressor effects of amphetamine, epinephrine, norepinephrine and angiotensin amide. In the same experiment, other known antihypertensive compounds having the characteristic guanidino group also decrease the pressor effects of amphetamine, but potentiate those of epinephrine, norepinephrine and angiotensin amide. In view of the fact that the compounds of this invention affect the responsiveness of the arterioles to catecholamines and hypertensive polypeptide compounds, they can be used to measure small quantities of such substances, which would not be detectable otherwise.

It has also been found, that the compounds of this invention do not significantly increase the heart rate; this is in contrast to other antihypertensive compounds having a similar pattern of pharmacological properties, which tend to cause considerable tachycardia.

It has also been observed that contrary to the compounds having the trans-configuration, particularly the trans-cinnamyl-guanidine, the compounds having the cis-configuration, particularly the cis-cinnamyl-guanidine, are virtually free from any effects on the respiration.

Particularly useful are the cis-isomers, as well as the trans-isomers of the compounds of the formula

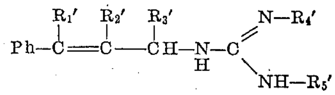

in which Ph stands for phenyl, (lower alkyl)-phenyl, (lower alkoxyl)-phenyl, (halogen)-phenyl or (trifluoromethyl)-phenyl, and each of the groups $R_1'$, $R_2'$ and $R_3'$ is particularly hydrogen, as well as methyl, and each of the groups $R_4'$ and $R_5'$ is primarily hydrogen, as well as lower alkyl, particularly methyl, or especially the acid addition salts, such as the pharmaceutically acceptable, non-toxic acid addition salts, thereof. This group is represented by the cis-isomers, as well as the trans-isomers of the compounds of the formula

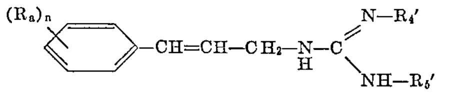

in which the group $R_a$ is primarily hydrogen, as well as lower alkyl, lower alkoxy or halogeno, the letter *n* is an integer from 1 to 3, and each of the groups $R_4'$ and $R_5'$ have the previously given meaning, but stand above all for hydrogen, above all by cinnamyl-guanidine of the formula

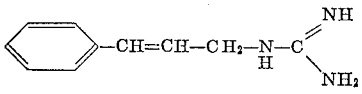

especially the cis-cinnamyl-guanidine of the formula

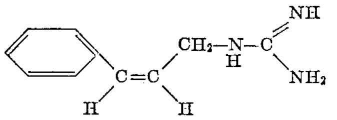

particularly the acid addition salts, such as the pharmaceutically acceptable, non-toxic acid addition salts, thereof.

The new guanidine compounds of this invention are prepared according to known methods, for example, by converting in an amine of the formula

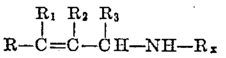

in which each of the groups R, $R_1$, $R_2$ and $R_3$ have the previously-given meaning, and $R_x$ is hydrogen or a group capable of being converted into an amidino group of the formula

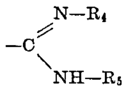

in which $R_4$ and $R_5$ have the previously-given meaning, or a salt thereof, the group of the formula —NH—$R_x$ into a guanidino group having the formula

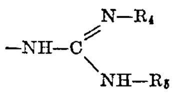

in which $R_4$ and $R_5$ have the previously-given meaning, and, if desired, converting a resulting salt into the free compound or into another salt, and/or, if desired, converting a free compound into a salt thereof, and/or, if desired, separating a resulting mixture of isomers into the single isomers.

The preferred starting materials used in the above reaction are those, in which $R_x$ stands for hydrogen. The reagents of choice for the conversion of an N-unsubstituted amino group into a guanidino group are the S-lower alkyl-isothioureas or O-lower alkyl-isoureas having the formula

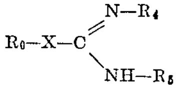

in which $R_4$ and $R_5$ have the previously-given meaning, $R_0$ stands for lower alkyl, particularly methyl, as well as ethyl, n-propyl, isopropyl and the like, and X is primarily sulfur, as well as oxygen, or acid addition salts thereof. The latter, which are employed in preference over the free compound, are especially the salts with mineral acids, such as hydrochloric, hydrobromic, sulfuric acid and the like. The preferred reagents are the mineral acid addition salts of S-methyl-isothiourea, e.g., S-methyl-isothiourea sulfate, hydrochloride and the like. The starting materials are preferably used in the form of the free bases.

The reaction is carried out by contacting the starting material with the reagent, preferably in the presence of a diluent, the choice of which depends primarily on the solubility of the reactants. Water or water-miscible organic solvents, such as lower alkanols, e.g., methanol, ethanol, propanol, isopropanol, tertiary butanol and the like, ethers, e.g., diethyleneglycol dimethylether, p-dioxane, tetrahydrofuran and the like, ketones, e.g., acetone, ethyl methyl ketone and the like, lower alkanoic acids, e.g., acetic acid and the like, formamides, e.g., formamide, N,N-dimethylformamide and the like, or aqueous mixtures of such solvents are preferred diluents. The reaction may be carried out at room temperature or at an elevated temperature, for example, on the steam bath or at the boiling temperature of the solvent. An absence of oxygen may be achieved by performing the reaction in the atmosphere of an inert gas, e.g., nitrogen.

Another reagent capable of transforming an N-unsubstituted amino group into the desired guanidino group, is a cyanamide compound of the formula

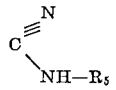

in which $R_5$ has the previously-given meaning. For example, a mixture of the cyanamide compound with the amine starting material, which is preferably used in the form of a salt thereof, particularly a mineral acid addition salt, e.g., hydrochloride, hydrobromide, sulfate and the like, is heated to form a melt, which is then dissolved in a solvent, such as a lower alkanoic acid, e.g., acetic acid and the like, and the desired product is isolated. The reaction may also be performed in the presence of a suitable solvent, such as a lower alkanol, e.g., ethanol and the like. The salt used as the starting material may also be formed in situ by carrying out the reaction in the presence of an acid, particularly of a concentrated aqueous mineral acid, e.g., hydrochloric acid and the like. The cyanamide reagent too may be formed in situ; for example, 1-nitroso-3-methyl-guanidine furnishes the N-methyl-cyanamide during the reaction, and the latter then reacts with the N-unsubstituted amine to form the desired guanidine compound. The reaction may proceed exothermically, and, if necessary, may be maintained by heating, for example, to from about 80° to about 200°; the atmosphere of an inert gas, e.g., nitrogen, may be advantageous.

A third modification of the general procedure for the manufacture of the compounds of this invention from the N-unsubstituted amine starting materials comprises reacting such starting material with a salt of a 1-guanyl-pyrazole. A salt of a 1-guanyl-pyrazole is primarily a salt with a mineral acid, such as, for example, nitric acid; the pyrazole nucleus of such reagent may contain additional substituents, particularly lower alkyl, e.g., methyl, ethyl and the like. 1-guanyl-3,5-dimethyl-pyrazole salts, particularly the nitrate thereof, represent the preferred reagents. The reaction may be carried out in the absence of a solvent, for example, by fusing the two reactants, or in the presence of a diluent, such as, for example, a lower alkanol, e.g., ethanol and the like; advantageously, contact with carbon dioxide should be avoided, for example, by performing the reaction in the atmosphere of an inert gas, e.g., nitrogen. The reaction mixture is preferably heated, for example, to the melting point of the mixture or to the boiling point of the solvent.

Starting materials used in the above procedure are known or are prepared according to the methods used for the known ones. However, the starting materials used for the preparation of the compounds having the cis-configuration are new and are intended to be included within the scope of this invention. These starting materials are represented by the compounds of the formula

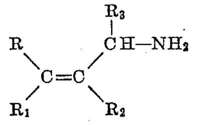

in which R, $R_1$, $R_2$ and $R_3$ have the previously given meaning, or the acid addition salts thereof. Particularly useful as starting materials for the preparation of the compounds of this invention having the cis-configuration are those of the formula

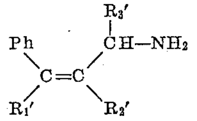

in which Ph, $R_1'$, $R_2'$ and $R_3'$ have the previously given meaning, especially those of the formula

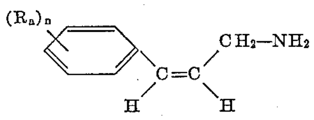

in which $R_a$ and the letter $n$ have the previously given meaning, or the acid addition salts thereof. The cis-cinnamyl-amine of the formula

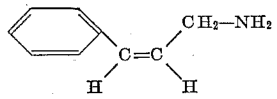

or the salts thereof, represent the preferred starting materials.

The above intermediates are prepared by converting in a cis-1-phenyl-3-$X_0$-1-propene compound, in which $X_0$ is a group capable of being converted into amino, the group $X_0$ into amino, and, if necessary, separating the desired cis-cinnamylamine from a resulting mixture of geometric isomers, and/or, if desired, converting a resulting salt into the free compound or into another salt, and/or, if desired, converting a resulting compound into a salt thereof.

A group $X_0$ capable of being converted into amino according to known methods, is above all the N-phthalimido group, which is split into the amino group by treatment with hydrazine. Halogeno, particularly bromo and the like, represents another group $X_0$ capable of being converted into amino by treatment with ammonia or an ammonia-furnishing reagent, whereas a carboxyl group or a functionally converted carboxyl group representing $X_0$ is converted into amino by any of the known methods, such as the Hofmann synthesis or the Curtius reaction.

The intermediates used for the preparation of the starting materials having the cis-configuration are conveniently prepared by treating a 1-phenyl-3-$X_0$-1-propyne compound, in which $X_0$ has the previously given meaning, but is particularly an N-phthalimido group, with hydrogen in the presence of a partially inactivated metal catalyst, such as a palladium-calcium carbonate catalyst, partially inactivated by treatment with lead acetate.

Apart from representing hydrogen, the group $R_x$ in the above amine starting materials may stand for a group capable of being converted into an amidino group of the formula

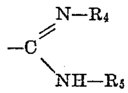

in which $R_4$ and $R_5$ have the previously given meaning.

Depending on the character of the substituent $R_x$, its conversion into an amidino group may be carried out according to different modifications.

For example, a carbon atom of the group $R_x$ may be attached to the nitrogen atom of the amino group of the starting material, and to this carbon atom may be connected another nitrogen atom; the carbon atom may carry an additional nitrogen, or other heteroatoms, such as, for example, oxygen or sulfur. The substituent $R_x$ may, therefore, be represented, for example, by cyano of the formula —C≡N, carbamyl of the formula —CONH—$R_4$, in which $R_4$ has the above-given meaning, thiocarbamyl of the formula —CSNH—$R_4$, lower alkoxy-(imino)methyl of the formula —C(=N—$R_4$)—$OR_0$, in which $R_0$ has the previously-given meaning, i.e., represents lower alkyl, primarily methyl, as well as ethyl and the like, lower alkyl-mercapto-(imino)methyl of the formula $$—C(=N—R_4)—SR_0$$

cyano-amidino of the formula $$—C(=N—R_4)—N(R_5)—C≡N$$

in which $R_5$ has the previously-given meaning, guanidino-(imino)methyl of the formula $$—C(=N—R_4)—[—N(R_5)—C(=NH)—NH_2]$$

isocyano-(imino)methyl of the formula $$—C(=N—R_4)—N=C=O$$

or isothiocyano-(imino)methyl of the formula $$—C(=N—R_4)—N=C=S$$

and the like. Amine starting materials having one of the above groups attached to the amino-nitrogen meet the previous requirements, i.e., to the amino group is attached a carbon atom, which carries at least one nitrogen atom, apart from other nitrogen or hetero atoms. Most of the above starting materials are converted into the desired guanidino derivatives by ammonolysis or aminolysis.

For example, a cyanamide starting material may be converted into a guanidine compound by treatment with ammonia, an ammonia-furnishing reagent or an amine. Such reaction may be carried out, for example, by treating the cyanamide compound with ammonia or an amine, usually under pressure, and at an elevated temperature, and, if necessary, in the presence of an anion capable of forming a stable salt with a resulting guanidine; ammonium acetate, ammonium sulfate, ammonium chloride and the like, may serve as anion sources. Ammonia may be replaced by ammonia-furnishing ammonium salts; such salts are, for example, ammonium monohydrogen phosphate, which may be used under pressure and at an elevated temperature, ammonium nitrate and the like. In the latter case, a salt, such as, for example, an alkaline earth metal or an alkali metal, e.g., calcium, sodium, potassium and the like, salt of the cyanamide starting material is preferably used, which may be reacted with the ammonium nitrate in the presence of catalytic amounts of water.

The cyanamide starting materials may be prepared, for example, by treating the N-unsubstituted amine of the previous formula with cyanogen halide, e.g., cyanogen chloride, cyanogen bromide and the like, advantageously in equivalent amounts and preferably in an inert solvent, such as, for example, diethyl ether and the like.

A carbamyl substituent representing $R_x$ in the above formula may be converted into the desired amidino group by treatment of the starting material having such group with ammonia or an amine, preferably, in the presence of a dehydrating agent, such as, for example, phosphorus pentoxide and the like. This reaction may be carried out at an elevated temperature and in a closed vessel; temperature and pressure may be reduced in the presence of a non-aqueous solvent and/or of a reaction accelerator, such as finely dispersed nickel, aluminum, aluminum oxide and the like. Furthermore, a thiocarbamyl group representing $R_x$ may be converted into an amidino group by treatment with ammonia or an amine, for example, in the presence of water and/or of a non-hydrolytic solvent, such as, for example, toluene and the like, and in the presence of a desulfurizing agent. The latter is selected advantageously from basic oxides, basic carbonates and the like, of heavy metals, such as lead, zinc, cadmium, tin, mercury and the like. Suitable desulfurizing agents are, for example, lead oxide, mercuric ocide, lead hydrogen carbonate and the like; mercuric chloride may also be used. The ammonolysis or aminolysis procedure is preferably carried out at an elevated temperature, and, if necessary, in a closed vessel, primarily to avoid loss of ammonia or the amine.

Urea and thiourea starting materials or salts thereof may be prepared, for example, from the N-unsubstituted amine having the previous formula by treating it with an ammonium cyanate or thiocyanate or with a metal, such as alkali metal, e.g., sodium, potassium and the like, cyanate or thiocyanate. These reagents are preferably used in the presence of a solvent, for example, water, which, if necessary, may contain a small amount of an acid, such as a mineral acid, e.g., hydrochloric, sulfuric acid and the like. The urea or thiourea starting materials may also be obtained by ammonolysis or aminolysis of reactive functional derivatives of N-substituted carbamic acids, as well as N-substituted thiocarbamic acids, in which the N-substituent has the formula

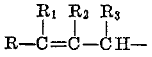

in which R, $R_1$, $R_2$ and $R_3$ have the previously given meaning. Reactive functional derivatives of N-substituted carbamic acids or N-substituted thiocarbamic acids are primarily esters, for example, lower alkyl, e.g. methyl, ethyl and the like, esters or halides, e.g. chlorides and the like, of such acids. Upon ammonolysis or aminolysis, if necessary, at an elevated temperature and in a closed vessel, these carbamic and thiocarbamic acids yield the desired urea or thiourea derivatives, respectively.

N-substituted O-lower alkyl-isoureas and N-substituted S-lower alkyl-isothioureas, in which the N-substituent has the formula

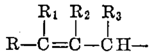

in which R, $R_1$, $R_2$ and $R_3$ have the previously given meaning, or salts thereof, are compounds of the previously given formula, in which $R_x$ is an O-lower alkoxy-(imino) methyl group of the formula $—C(=N—R_4)—OR_0$ and an S-lower alkyl-mercapto-(imino)methyl group of the formula $—C(=N—R_4)—SR_0$, respectively. Ammonolysis of these starting materials to form the desired guanidine compounds may be carried out by treatment with ammonia, either in its liquid form or in solution, such as an aqueous solution, whereby an elevated temperature and/or a closed vessel, as well as the presence of an ammonium salt, such as ammonium chloride and the like, may be required. If necessary, dehydrating agents or desulfurizing agents, such as those previously described, may be present in the reaction medium, depending on the type of starting material used.

The isourea and isothiourea starting materials may be obtained, for example, from the previously-mentioned urea and thiourea compounds by treatment of the latter or of their metal salts, such as the alkali metal, e.g., sodium, potassium and the like, salts thereof, with a lower alkyl halide, e.g., methyl or ethyl chloride, bromide or iodide and the like, or with a di-lower alkyl sulfate, e.g., dimethyl sulfate, diethyl sulfate and the like. Such reaction may be carried out in the presence of a solvent, the selection of which depends on the type of reagents used; a free urea or thiourea compound may be used in the presence of water or a lower alkanol, e.g., methanol, ethanol and the like, whereas an alkali metal salt of the urea or thiourea compound may be reacted in the presence of a hydrocarbon, e.g., toluene and the like, solution.

A cyanamidino substitutent representing $R_x$ in the starting materials of the previously given formula, may be converted into an amidino group by ammonolysis or aminolysis. Such reaction may be carried out by treatment with ammonia, as well as with an ammonium salt, e.g., ammonium chloride, ammonium nitrate, ammonium sulfate and the like, which may also promote ammonolysis with ammonia itself, or by treatment with an amine.

In the ammonolysis or aminolysis procedure of a cyano-guanidine derivative as described above, a biguanide intermediate may be formed, which, upon further treatment with the ammonolysis or aminolysis reagent, may be converted into the desired guanidine compound. Such biguanide derivative is accessible through different routes (as will be shown below), and is, therefore, also useful as a starting material in the formation of the desired guanidine compounds of this invention.

The cyano-guanidine starting material may also be converted into the desired guanidine compound by reductive cleavage of the cyano group. Such cleavage may be carried out, for example, by electrolytic reduction on a cathode, e.g., a lead cathode.

The cyano-guanidine starting material used in the above ammonolysis, aminolysis or reduction procedure, may be prepared by treatment of an N-substituted S-lower alkyl-cyano-isothiourea, in which the N-substituent has the formula

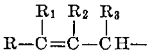

in which R, $R_1$, $R_2$ and $R_3$ have the previously given meaning, with ammonia or an amine, for example, in the presence of a lower alkanol, e.g., ethanol and the like, preferably in a sealed tube.

Since the previously-described cyano-guanidine derivatives are obtained by ammonolysis or aminolysis from S-lower alkyl-cyanoisothiourea compounds, the latter may, therefore, directly serve as starting materials for the preparation of the desired guanidine compounds of this invention. Ammonolysis or aminolysis of the cyanoisothiourea compounds to the latter may be carried out by treatment with ammonia or an amine in the presence of the anion of a strong acid, such as of a hydrohalic, nitric, sulfuric acid and the like, for example, in the presence of the respective ammonium salts of such acids.

The above N-substituted S-lower alkyl-cyanoisothiourea starting materials or their salts may be obtained, for example, by treating the corresponding N-substituted isothiocyanate with an alkali metal, e.g., sodium, cyanamide, and alkylating a resulting N-substituted-N'-cyano-2-thiourea, preferably a salt thereof, according to the previously described method, for example, with a lower alkyl halide or with a di-lower alkyl sulfate.

As has been shown, ammonolysis or aminolysis of the cyano-guanidine starting materials may give rise to the formation of biguanide compounds or salts thereof.

These compounds may also be prepared, for example, by reacting an N-substituted amine, in which the N-substituent has the formula $$R-\overset{R_1}{\overset{|}{C}}=\overset{R_2}{\overset{|}{C}}-\overset{R_3}{\overset{|}{C}}H-$$

in which R, $R_1$, $R_2$ and $R_3$ have the previously given meaning, with dicyano-diamide, preferably in the presence of a complex metal-forming salt, e.g. copper sulfate and the like. The resulting biguanide complex metal salt, such as the copper complex salt thereof, may be liberated to form the free compound by treatment with an acid, such as a mineral acid, e.g. sulfuric acid and the like, to yield the free compound. As previously described, ammonolysis or aminolysis of these biguanide derivatives gives rise to the formation of the desired guanidine compounds of this invention.

Certain substituents $R_x$ may be converted into the amidino group by methods other than the above ammonolysis and aminolysis reactions.

For example, the substituent $R_x$ may be an isocyano-(imino)methyl or an isothiocyano-(imino)methyl group of the formulae $-C(=N-R_4)-N=C=O$ and $$-C(=N-R_4)-N=C=S$$

respectively. Compounds containing such groups yield upon treatment with a hydrolytic reagent, particularly with a dilute mineral acid, such as aqueous sulfuric acid and the like, the desired guanidine compounds. In such hydrolysis reaction, the desired guanidine derivative may be formed simultaneously with a biuret derivative as the by-product.

Starting materials having an isocyano-(imino)methyl or an isothiocyano-(imino)methyl group, or salts thereof, may be obtained, for example, by reacting an N-substituted cyanamide in which the N-substituent has the formula $$R-\overset{R_1}{\overset{|}{C}}=\overset{R_2}{\overset{|}{C}}-\overset{R_3}{\overset{|}{C}}H-$$

in which R, $R_1$, $R_2$ and $R_3$ have the previously given meaning, with a metal, particularly an alkali metal, e.g., sodium or potassium, cyanate or thiocyanate, in a neutral medium, for example, in the presence of water.

Apart from N-substituted N—$R_x$-amine starting materials, in which $R_x$ is a substituent having a carbon atom with a substituting nitrogen, other N—$R_x$-amines, in which $R_x$ is a substituent convertible into an amidino group, may be useful as starting materials in the manufacture of the desired guanidine compounds. In such conversion, intermediate compounds may be formed, which may have the previously described characteristics, i.e., the carbon atom of the group $R_x$ carries a nitrogen atom. Suitable $R_x$ groups of that type are, for example, ester groups, a formed by a carboxyl, a thionocarboxyl, a thiolocarboxyl or a dithiocarboxyl group with a lower alkanol, as well as halogeno-carbonyl or halogeno-thionocarbonyl groups, in which halogeno represents primarily chloro. Particularly useful starting materials are, for example, the reactive functional derivatives of N-substituted carbamic acids and N-substituted thiocarbamic acids, in which the N-substituent has the formula $$R-\overset{R_1}{\overset{|}{C}}=\overset{R_2}{\overset{|}{C}}-\overset{R_3}{\overset{|}{C}}H-$$

in which R, $R_1$, $R_2$ and $R_3$ have the previously given meaning, or salts thereof. As shown above, upon ammonolysis or aminolysis, esters, for example, lower alkyl, e.g., methyl, ethyl and the like, esters, or halides, e.g., chlorides, of such acids yield the corresponding urea and thiourea derivatives. However, if, for example, the ammonolysis or aminolysis of a carbamic acid ester is carried out in the presence of a dehydrating agent, such as, for example, one of the previously described agents, an N-substituted-carbamic ester may be converted directly into the desired guanidine compound. Or, an ester of an N-substituted-thiocarbamic acid, when subjected to ammonolysis or aminolysis, may yield directly the desired guanidine compound, if the reaction is carried out in the presence of a desulfurizing reagent, such as one of those previously described, e.g., lead oxide and the like.

The carbamic and thiocarbamic acid starting materials may be prepared according to known methods. For example, upon treatment of an N-substituted amine of the previous formula with phosgene or thiophosgene, which reagents may be used in a slight excess over the amines, N-substituted isocyanates and N-substituted isothiocyanates, respectively, may be formed, in which the N-substituent has the formula $$R-\overset{R_1}{\overset{|}{C}}=\overset{R_2}{\overset{|}{C}}-\overset{R_3}{\overset{|}{C}}H-$$

in which R, $R_1$, $R_2$ and $R_3$ have the previously given meaning. Such cyanate and isothiocyanate compounds may then be converted into esters of N-substituted carbamic acids or N-substituted thiocarbamic acids by treatment with an alcohol, for example, a lower alkanol, e.g., methanol, ethanol and the like, or into the corresponding thiolesters, by treatment with a mercaptan, such as a lower alkyl-mercaptan, e.g., methylmercaptan, ethylmercaptan and the like. The above derivatives may also be obtained by reacting an N-substituted amine of the previous formula with a carbonic acid lower alkyl ester, or, particularly, a dithiocarbonic acid lower alkyl ester, as well as with a lower alkyl ester of a halogeno-formic acid, such as chloroformic acid, or, primarily of a halogeno-thioformic acid, such as chlorothioformic acid.

Or, a salt of an N-substituted amine of the previous formula, particularly a hydrohalide, e.g., hydrochloride and the like, thereof, when reacted with phosgene or thiophosgene at an elevated temperature, preferably in a closed vessel, yields the desired N-substituted-carbamic acid chloride and N-substituted-thiocarbamic acid chloride, respectively.

Compounds of this invention having the previously given formula, in which the group $R_3$ stands for hydrogen, may also be prepared by replacing in a compound of the formula $$R-\overset{R_1}{\overset{|}{C}}=\overset{R_2}{\overset{|}{C}}-\overset{X}{\overset{\|}{C}}-NH-C\begin{matrix}\nearrow N-R_4 \\ \searrow NH-R_5\end{matrix}$$

in which R, $R_1$, $R_2$, $R_4$ and $R_5$ have the above meaning, and X stands for oxygen or sulfur, or a salt thereof, the group X by two hydrogen atoms, and if desired, carrying out the optional steps.

The group X forms together with the carbon atom a carbonyl group or a thiocarbonyl group, and in the above reaction, such group is converted into methylene. The reduction of carbonyl into the latter is carried out according to known methods, for example, by treatment with an aluminum hydride, particularly an alkali metal aluminum hydride, e.g., lithium aluminum hydride, sodium aluminum hydride and the like, or an alkaline earth metal aluminum hydride, e.g., magnesium aluminum hydride and the like, or aluminum hydride. If necessary, activators such as, for example, aluminum chloride, may be used together with the hydride reduction reagent. The reduction with these reagents is preferably performed in the presence of an inert solvent, particularly an ether, such as a di-lower alkyl ether, e.g., diethyl ether, dipropyl ether and the like, a carbocyclic aryl lower alkyl ether, e.g., anisole and the like, a cyclic ether, e.g., tetrahydrofuran, p-dioxane and the like, or any other suitable solvent, and at an elevated temperature. Conversion of carbonyl into methylene may also be achieved by treatment with hydrogen in the presence of certain catalysts, such as copper-chronium catalysts or by electrolytic reduction.

Replacement of sulfur in the thiocarbonyl group by two hydrogens may be carried out by desulfurization according to known methods, for example, by treatment with a freshly prepared hydrogenation catalyst, such as Raney nickel, in an alcoholic solvent, e.g., methanol, ethanol and the like, if desired, in the presence of hydrogen; it may also be achieved by electrolytic reduction.

The starting materials used in the above reduction procedure may be prepared, for example, by treating a reactive functional derivative of a carboxylic acid of the formula

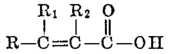

in which R, $R_1$ and $R_2$ have the previously given meaning, with a guanidine of the formula

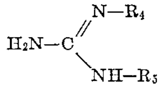

in which $R_4$ and $R_5$ have the above given meaning. A particularly suitable reactive functional derivative is, for example, an ester, such as a lower alkyl, e.g., methyl, ethyl and the like, ester or an activated ester, which is particularly useful for the formation of amide bonds, such as an ester with a reactive mercaptan compound, e.g., mercapto-acetic acid and the like, or with a reactive hydroxyl compound, e.g., hydroxy-acetonitrile and the like. The treatment of the above reactive functional derivative of a carboxylic acid with the guanidine compound may be carried out, for example, by reacting it with the guanidine in the presence of a suitable solvent, if necessary, at an elevated temperature.

A resulting mixture, such as a mixture of the geometric cis- and trans-isomers, may be separated into the single isomers according to known methods. Mixtures of geometric isomers may arise due to the use of starting materials containing both, the cis- and trans-forms, or may be formed during the course of the reaction. Separation of the mixture and isolation of the single geometric cis- and trans-isomers may be achieved by exploiting the physio-chemical differences, particularly the different solubilities and the like, of the two stereoisomeric forms, for example, by fractional separation, particularly fractional crystallization and the like.

A resulting salt may be converted into the free compound in the customary way, for example, by treatment with a strong alkaline reagent, such as an alkali metal hydroxide, e.g. lithium hydroxide, sodium hydroxide, potassium hydroxide and the like, a strong quaternary ammonium anion (hydroxyl ion) exchange preparation and the like.

A resulting salt may be converted into another salt according to known methods. For example, a "monosulfate" may be formed by reacting the "half-sulfate" with sulfuric acid. Furthermore, a resulting salt may be converted into another salt by treatment with a suitable ion exchange preparation, or with a salt, e.g., sodium, barium, silver and the like, salt of an acid in the presence of a diluent, in which a resulting inorganic compound is insoluble and is thus removed from the reaction medium.

A free compound may be transformed into an acid addition salt by reacting it, preferably a solution thereof in the presence of a solvent or solvent mixture, with the appropriate inorganic or organic acid or a solution thereof, or with an anion exchange preparation, and isolating the salt. Semi-, mono- or poly-salts may be formed, as well as mixed salts, and the salts may be isolated in the form of their hydrates or may contain solvent of crystallization.

The invention also comprises any modification of the general process, wherein a compound obtainable as an intermediate at any stage of the process is used as the starting material and the remaining step(s) of the process is (are) carried out; also included within the scope of the invention are any new intermediates.

In the process of this invention such starting materials are preferably used which lead to final products mentioned in the beginning as preferred embodiments of the invention.

The following examples illustrate the invention and are not to be construed as being limitations thereon. Temperatures are given in degrees centigrade.

*Example 1*

A mixture of 6.0 g. of trans-cinnamyl-amine and 6.2 g. of S-methyl-isothiourea sulfate in 15 ml. of water refluxed for four hours. A solid material precipitates on cooling and is recrystallized from water to yield the trans-cinnamyl-guanidine sulfate of the formula:

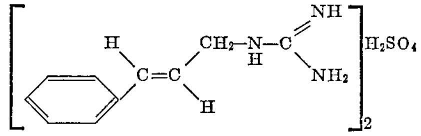

which melts at 246–248°; yield: 7.0 g. or 85 percent of theory.

The starting material used in the above procedure is known and is prepared as follows: A mixture of 56.9 g. of trans-cinnamyl chloride and 74.0 g. of the phthalimide potassium salt in 400 ml. of N,N-dimethylformamide is stirred for one hour at room temperature, and is then diluted with 400 ml. of chloroform. The resulting slurry is poured into 1,000 ml. of water; the organic layer is separated, the aqueous phase is extracted with chloroform, and the combined organic solutions are washed with 200 ml. of a 0.2 N aqueous solution of sodium hydroxide and with water. After drying, the solution is concentrated under reduced pressure to yield 42.0 g. of the trans-N-cinnamyl-phthalimide, which melts at 155–157°.

A mixture of 42.0 g. of trans-N-cinnamyl-phthalimide in 500 ml. of methanol is reacted with 20 ml. of hydrazine hydrate (99–100 percent) by refluxing for one hour. The resulting solution is cooled, acidified with 250 ml. of concentrated hydrochloric acid and refluxed for an additional thirty minutes. After cooling and filtering, the reaction mixture is concentrated under reduced pressure to a small volume, is again cooled and filtered, and then washed with diethyl ether to yield 13.2 g. of trans-cinnamyl-amine hydrochloride, M.P. 246–250°, which is converted into the free trans-cinnamyl-amine by dissolving it in water, treating the solution with a 50 percent aqueous solution of potassium hydroxide, saturating it with sodium carbonate and extracting the desired base with diethyl ether. The trans-cinnamyl-amine is purified by distillation and recovered at 71–74°/1 mm.

*Example 2*

A mixture of 3.4 g. of trans-cinnamyl-amine and 3.24 g. of S-methyl-isothiourea hydrochloride is 50 ml. of methanol is refluxed for six hours and concentrated under reduced pressure. The solid residue is recrystallized from acetonitrile and yields 2.7 g. of trans-cinnamyl-guanidine hydrochloride, M.P. 165–170°.

*Example 3*

A column of 27 cm. length and 1.5 cm. width is charged with 35.1 g. of a (polystyrene)-type anion exchange resin-high porosity (Amberlite IRA–401, analytical grade) and is washed with 600 ml. of a 1 N solution of methane sulfonic acid in water at a flow rate of one drop per second. The eluate gives a negative test for chlorine ion; the column is washed to neutrality with 200 ml. of water, followed by 200 ml. of anhydrous methanol.

The column is then charged with a solution of 2.0 g. of trans-cinnamyl-guanidine hydrochloride in 250 ml. of methanol. The combined organic eluates are concentrated under reduced pressure; the resulting solid trans-cinnamyl-guanidine methane sulfonate melts at 113–115° after one recrystallization from a mixture of methanol and diethyl ether; yield: 1.9 g.

*Example 4*

A mixture of 9.6 g. of trans-cinnamyl-amine and 19.2 g. of N,N′,S-trimethyl-isothiourea monohydriodide in 65 ml. of ethanol is refluxed for four hours. After the evolution of methylmercaptan has ceased, the solvent is evaporated under reduced pressure; on standing the residue crystallizes to yield the trans-1,2-dimethyl-3-cinnamyl-guanidine hydriodide of the formula:

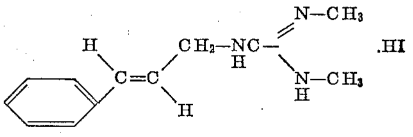

which melts at 148–158° after recrystallization from a mixture of ethanol and diethyl ether; yield: 20.5 g.

*Example 5*

A mixture of 5.0 g. of trans-p-methoxy-cinnamyl-amine and 4.26 g. of S-methyl-isothiourea sulfate in 25 ml. of water is refluxed for four hours. The reaction mixture is then cooled, whereupon the trans-p-methoxy-cinnamyl-guanidine sulfate of the formula

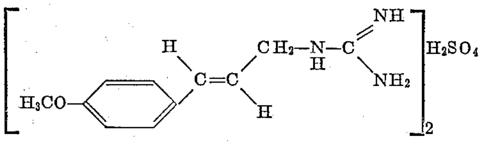

precipitates; it melts at 163–166° after recrystallization from water; yield: 4.7 g.

The starting material used in the above procedure is prepared as follows: To a mixture of 41.5 g. of phosphorus bromide and 13.0 g. of pyridine is added dropwise 57.6 g. of trans-p-methoxy-cinnamyl alcohol while stirring and cooling in an ice-bath at −5°. Cooling and stirring is continued overnight; the reaction mixture is extracted with diethyl ether, the ether solution is evaporated and the residue is fractionated by distillation. The desired trans-p-methoxy-cinnamyl bromide is collected at 150–154°/16 mm.; yield: 49.8 g.

A mixture of 48.0 g. of trans-p-methoxy-cinnamyl bromide, 42.5 g. of potassium phthalimide and a crystal of potassium iodide in 75 ml. of N,N-dimethylformamide is refluxed for two hours and then poured onto ice. The organic material is extracted with chloroform; the organic extract is washed with a 1 N solution of potassium hydroxide in water, 0.05 N aqueous hydrochloric acid and water, dried over sodium sulfate and concentrated to yield an oil containing the trans-N-(p-methoxy-cinnamyl)-phthalimide.

A mixture of 49.5 g. of the above oil and 20 ml. of hydrazine hydrate in 500 ml. of methanol is refluxed for two hours. A precipitate is formed within 25–30 minutes; after cooling, concentrated hydrochloric acid is added until the reaction mixture is acidic, whereupon it is refluxed for an additional thirty minutes. It is then filtered and concentrated to dryness under reduced pressure. The residue, containing the trans-p-methoxy-cinnamylamine hydrochloride is treated with an aqueous solution of potassium hydroxide; the organic material is extracted with diethyl ether and the organic solution is evaporated under reduced pressure. The oily trans-p-methoxy-cinnamyl-amine is used without further purification; its hydrochloride, prepared by dissolving the base in ethanol and treating the solution with hydrogen chloride gas, melts at 215–230°.

*Example 6*

A mixture of 5.0 g. of trans-o-chloro-cinnamyl-amine and 4.16 g. of S-methyl-isothiourea sulfate in 25 ml. of water is refluxed for four hours. After the evolution of methylmercaptan ceases, the reaction mixture is cooled and the solid material is filtered off. On recrystallization from water, it yields the trans-o-chloro-cinnamyl-guanidine sulfate of the formula

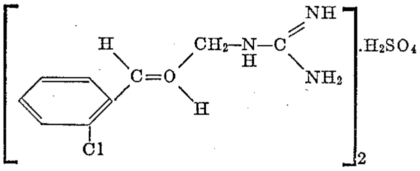

which melts at 230–231°; yield: 5.0 g.

The starting material is prepared as described in Example 5 using trans-o-chloro-cinnamyl alcohol as the starting material.

*Example 7*

A mixture of 5.0 g. of trans-m-chloro-cinnamyl-amine and 4.16 g. of S-methyl-isothiourea sulfate in 25 ml. of water is reacted as described in Example 6; the desired trans-m-chloro-cinnamyl-guanidine sulfate of the formula

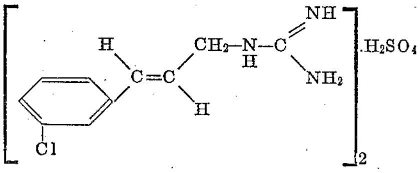

melts at 151–154° after recrystallization from water; yield: 4.5 g.

The starting material is prepared as described in Example 5 using trans-m-chloro-cinnamyl alcohol as the starting material.

*Example 8*

A mixture of 6.0 g. of trans-p-chloro-cinnamyl-amine and 5.5 g. of S-methyl-isothiourea sulfate in 15 ml. of water containing a few drops of ethanol is refluxed for five hours. The solvent is evaporated, the resulting oil solidifies and is recrystallized from a mixture of ethanol and water to yield the trans-p-chloro-cinnamyl-guanidine sulfate of the formula:

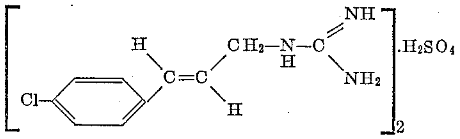

which melts at 200–209°; yield: 6.0 g.

The starting material is prepared as described in Example 5 using trans-p-chloro-cinnamyl alcohol as the starting material.

*Example 9*

A mixture of 6.0 g. of cis-cinnamyl-amine and 5.71 g. of S-methyl-isothiorea hydrochloride in 75 ml. of methanol is refluxed for six hours, during which a strong evolution of methylmercaptan occurs. The reaction mixture is concentrated under reduced pressure, and the resulting oil is dissolved in a minimum amount of ethanol (or acetonitrile), and the desired cis-cinnamyl-guanidine hydrochloride of the formula

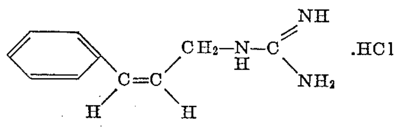

is precipitated as an oil by adding diethyl ether, M.P. <20°.

The starting material used in the above procedure is prepared as follows: A mixture of 20.35 g. of 3-chloro-1-phenyl-1-propyne (prepared according to the precedure described by Murray, J. Am. Chem. Soc., vol. 60, p. 2662 (1938)) and 27.0 g. of the phthalimide potassium salt in 160 ml. of N,N-dimethylformamide, containing a crystal of potassium iodide is stirred at room temperature for fifteen hours, and is then diluted with 160 ml. of chloroform while stirring. After being poured into 500 ml. of water, the organic phase is separated, the aqueous layer is extracted three times with chloroform and the combined chloroform solutions are washed with 0.2 N aqueous sodium hydroxide and water, dried over sodium sulfate and concentrated under reduced pressure to yield 30.0 g. of N-(3-phenyl-2-propynyl)-phthalimide, M.P. 158–160°.

A mixture of 25.0 g. of N-(3-phenyl-2-propynyl)-phthalimide, 1.96 g. of Lindlar catalyst (palladium-calcium carbonate catalyst, partially inactivated by treatment with lead acetate according to the procedure described by Lindlar, Helv. Chim. Acta, vol. 35, p. 446 (1952)), and 5 ml. of quinoline in 1,050 ml. of ethyl acetate is treated with hydrogen at room temperature and under atmospheric pressure. After the calculated amount of hydrogen has been absorbed (about six hours), the hydrogenation reaction is interrupted and the catalyst is filtered off. The filtrate is evaporated under reduced pressure to yield 25.0 g. of cis-N-cinnamyl-phthalimide, M.P. 110–111° after recrystallization from a 1:1-mixture of ethanol and water.

A solution of 45.0 g. of cis-N-cinnamyl phthalimide in 800 ml. of methanol containing 25 ml. of hydrazine hydrate (99–100%) is refluxed for three hours while stirring. After cooling and acidification with concentrated hydrochloric acid, the reaction mixture is again refluxed for thirty minutes. After being cooled and filtered, the solution is concentrated under reduced pressure to a small volume and treated with a small amount of water, a 50 percent aqueous solution of potassium hydroxide and a saturated aqueous solution of solid potassium carbonate. The organic material is extracted with diethyl ether, and the organic solution is dried and concentrated under reduced pressure to yield 16.0 g. of the cis-cinnamyl-amine of the formula

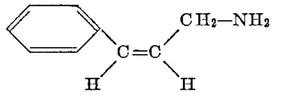

Its hydrochloride, prepared by treating the free base with ethanolic hydrogen chloride and diluting the resulting solution with diethyl ether, melts at 177–178° after recrystallization from a mixture of ethanol and diethyl ether.

*Example 10*

A mixture of 3.0 g. of cis-cinnamyl-amine and 3.14 g. of S-methyl-isothiourea sulfate in 20 ml. of water (free from carbon dioxide) and under an atmosphere of nitrogen is heated on the steam bath for one hour and then refluxed for an additional three hours. After standing at room temperature overnight, the reaction mixture is concentrated under reduced pressure to yield the cis-cinnamyl-guanidine sulfate of the formula

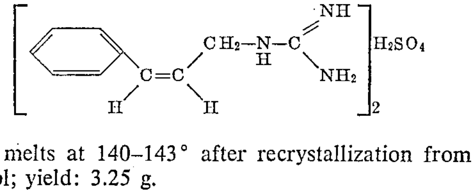

which melts at 140–143° after recrystallization from n-butanol; yield: 3.25 g.

*Example 11*

Other compounds prepared according to the previously described method by selecting the appropriate starting materials are, for example:

| Amine Starting Material | S-methyl-isothiourea Reagent | Guanidine Product |
|---|---|---|
| Cis-cinnamyl-amine | N,N′,S-trimethylisothiourea hydriodide. | Cis-1,2-dimethyl-3-cinnamyl-guanidine hydriodide. |
| Cis-p-methoxy-cinnamyl-amine. | S-methyl-isothiourea sulfate. | Cis-p-methoxy-cinnamyl-guanidine sulfate. |
| Cis-o-chloro-cinnamyl-amine. | do | Cis-o-chloro-cinnamyl-guanidine sulfate. |
| Cis-m-chloro-cinnamyl-amine. | do | Cis-m-chloro-cinnamyl-guanidine sulfate. |
| Cis-p-chloro-cinnamyl-amine. | do | Cis-p-chloro-cinnamyl-guanidine sulfate. |
| Trans-cinnamyl-amine | N,S-dimethyl-isothiourea hydriodide. | Trans-1-cinnamyl-2-methyl-guanidine hydriodide. |
| Do | N,N′-diethyl-S-methyl-isothiourea hydrobromide. | Trans-1-cinnamyl-2,3-diethyl-guanidine hydrobromide. |
| Trans-α-methyl-cinnamyl-amine. | S-methyl-isothiourea sulfate. | Trans-α-methyl-cinnamyl-guanidine sulfate. |
| Trans-β-methyl-cinnamyl-amine. | do | Trans.β-methyl-cinnamyl-guanidine sulfate. |
| Trans-o-fluoro-cinnamyl-amine. | do | Trans-o-fluoro-cinnamyl-guanidine sulfate. |
| Trans-o-bromo-cinnamyl-amine. | do | Trans-o-bromo-cinnamyl-guanidine sulfate. |
| Trans-o,p-dichloro-cinnamyl-amine. | do | Trans-o,p-dichloro-cinnamyl-guanidine sulfate. |
| Trans-p-methyl-cinnamyl-amine. | do | Trans-p-methyl-cinnamyl-guanidine sulfate. |
| Trans-m,m′,p-trimethoxy-cinnamyl-amine. | do | Trans-m,m′,p-trimethoxy-cinnamyl-guanidine sulfate. |
| Trans-m-methoxy-p-methoxy-carnobyloxy-cinnamyl-amine. | do | Trans-m-methoxy-p-methoxy-carbonyloxy-cinnamyl-guanidine sulfate. |
| Trans-p-trifluoro-methyl-cinnamyl-amine. | do | Trans-p-trifluoro-methyl-cinnamyl-guanidine sulfate. |
| Cis-o-fluoro-cinnamyl-amine. | do | Cis-o-fluoro-cinnamyl-guanidine sulfate. |
| Cis-o-bromo-cinnamyl-amine. | do | Cis-o-bromo-cinnamyl-guanidine sulfate. |
| Cis-o,p-dichloro-cinnamyl-amine. | do | Cis-o,p-dichloro-cinnamyl-guanidine sulfate. |
| Cis-p-methyl-cinnamyl-amine. | do | Cis-p-methyl-cinnamyl-guanidine sulfate. |
| Cis-m,m′,p-trimethoxy-cinnamyl-amine. | do | Cis-m,m′,p-trimethoxy-cinnamyl-guanidine sulfate. |
| Cis-m-methoxy-p-methoxy-carbonyloxy-cinnamyl-amine. | do | Cis-m-methoxy-p-methoxy-carbonyloxy-cinnamyl-guanidine sulfate. |
| Cis-p-trifluoromethyl-cinnamyl-amine. | do | Cis-p-trifluoromethyl-cinnamyl-guanidine sulfate. |

Also included within the scope of this invention are new compositions for the treatment of hypertensive conditions, consisting essentially of a pharmacologically effective amount of a compound of the formula

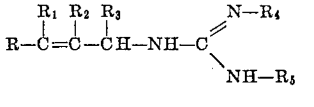

in which R, $R_1$, $R_2$, $R_3$, $R_4$ and $R_5$ have the previously-given meaning, having the cis-configuration as well as the trans-configuration or a pharmaceutically acceptable, non-toxic acid addition salt thereof, as the active antihypertensive ingredient, together with a pharmaceutically acceptable carrier, as well as a method for the treatment of hypertension, using such compositions.

Preferred compositions for the treatment of hypertension are those consisting essentially of a pharmacologically effective amount of a pharmaceutically acceptable, non-toxic acid addition salt of a compound of the formula

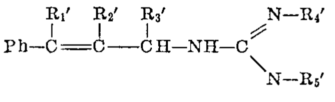

in which Ph, $R_1'$, $R_2'$, $R_3'$ $R_4'$ and $R_5'$ have the previously-given meaning, having the cis-configuration, as well as the trans-configuration, such as the compound of the formula

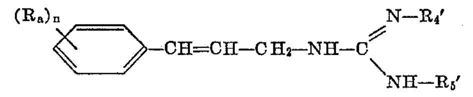

in which $R_a$, the letter *n*, and the groups $R_4'$ and $R_5'$ have the previously-given meaning, having the cis-configuration, as well as the trans-configuration, especially a pharmaceutically acceptable, non-toxic acid addition salt of cinnamyl-guanidine of the formula

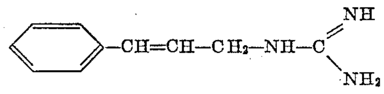

preferably of cis-cinnamyl-guanidine of the formula

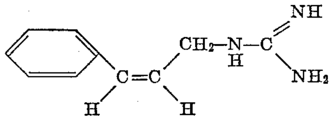

for example, the sulfates and the like, of these compounds, as the active antihypertensive ingredient, together with a pharmaceutically acceptable carrier.

The compositions ar perepared by combining the active ingredient with a pharmaceutically acceptable organic or inorganic carrier for enteral, e.g., oral, or parenteral use, in specified proportions. The compositions of this invenvention are preferably made up to contain at most equal amounts of the active antihypertensive ingredient and the carrier; usually, the latter represents the major portion of the compositions of this invention. The latter contain from about 1 percent to at most 50 percent, preferably from about 5 percent to about 40 percent, by weight, of the active antihypertensive ingredient.

Tablets, capsules, dragées and the like represent the preferred oral form of administration. These orally applicable compositions may be compounded to have per single dosage unit from about 0.005 g. to about 0.05 g., especially from about 0.005 g. to about 0.025 g., of the active antihypertensive ingredient, which is preferably used in the form of the pharmaceutically acceptable, non-toxic acid addition salt, such as one of the above-mentioned salts with an inorganic or organic acid, e.g., hydrochloric, sulfuric, phosphoric, tartaric, maleic, citric, methane sulfonic, p-toluene sulfonic, naphthalene 2-sulfonic acid and the like.

Apart from the active compound, the orally applicable preparations may contain substances commonly employed in the pharmaceutical art of preparing dosage unit compositions. These may include excipients, binders, fillers, lubricants, stabilizers or any other suitable ingredients. Examples of such carrier materials are starches, e.g., corn starch, wheat starch, rice starch and the like, sugars, e.g., lactose, glucose, sucrose and the like, stearic alcohol, talc, gums, tragacanth, acacia, polyalkylene glycols and the like. The quantity and the nature of the ingredients may vary widely and depend, to some degree, upon the desired physical appearance (softness and the like), or the size of the composition, the method of manufacture and the like. Encapsulation may also be effected using, if desired, the same excipients as those used for tablets. The compounding of the formulations is generally carried out in the manner normally employed in the art, i.e., by manufacturing a mixture, a granulate and the like. Any compatible color, approved and certified under the provisions of the Federal Food, Drug and Cosmetic Law may be used for aesthetic purposes or as a means of identification.

Other suitable pharmaceutical preparations which may be used for the treatment of hypertension and contain from about 1 percent to at most 50 percent, preferably from about 5 percent to about 40 percent, of a compound of this invention, especially of cinnamyl-guanidine, particularly the cis-cinnamyl-guanidine, preferably in the form of a pharmaceutically acceptable, non-toxic acid addition salt thereof, as the active antihypertensive ingredients are, for example, parenteral solutions and the like. These preparations are manufactured according to methods known in the pharmaceutical arts using appropriate carrier materials. Parenteral solutions contain water or aqueous mixtures of water-miscible organic solvents, e.g., ethanol and the like, as diluents. Other ingredients, particularly stabilizers, such as, for example, anti-oxidants, e.g., thiourea, sodium sulfide, sodium metabisulfite, ascorbic acid, cysteine hydrochloride, sodium formaldehyde sulfoxylate and the like, mono-thioglycerol, thiosorbitol and the like, buffer combinations to ensure a pH of about 7, such as, for example, acetic acid: sodium acetate, potassium phthalate: sodium hydroxide, potassium dihydrogen phosphate: di-sodium hydrogen phosphate, potassium dihydrogen phosphate: sodium hydroxide and the like, salts for making isotonic solutions, e.g., sodium chloride and the like, are added to ensure stable solutions suitable for injection.

*Example 12*

Capsules containing 0.015 g. each of cis-cinnamyl-guanidine sulfate are prepared as follows (for 1,000 capsules):

| Ingredients: | G. |
|---|---|
| Cis-cinnamyl-guanidine sulfate | 15.0 |
| Corn starch | 30.0 |
| Lactose | 155.0 |

The cis-cinnamyl-guanidine sulfate is passed through a No. 30 screen; the corn starch is added and mixed well. The lactose is added in portions and mixing is continued. Portions of 0.2 g. of the mixture are filled into No. 3 capsules.

*Example 13*

Tablets containing 0.015 g. each of cis-cinnamyl-guanidine sulfate are prepared as follows (for 1,000 tablets):

| Ingredients: | G. |
|---|---|
| Cis-cinnamyl-guanidine sulfate | 15.0 |
| Tragacanth | 3.0 |
| Lactose | 123.0 |
| Corn starch | 7.5 |
| Magnesium stearate | 1.5 |
| Alcohol 3A, 50% q.s. | |

The cis-cinnamyl-guanidine sulfate, the tragacanth and the lactose is mixed in a suitable mixer and granulated with the 50 percent alcohol. The granulate is passed through a No. 10 screen, dried at room temperature with circulating air, and passed through a No. 16 screen. The screened material is returned to the mixer; the corn starch and the magnesium stearate are added and mixing is continued. The mixture is again passed through a No. 16 screen and compressed into tablets, each weighing 0.15 g., using 10/32 inch standard, concave punches, uppers bisected.

*Example 14*

Capsules containing 0.015 g. each of trans-cinnamyl-guanidine sulfate are prepared as follows (for 1,000 capsules):

| Ingredients: | G. |
|---|---|
| Trans-cinnamyl-guanidine sulfate | 15.0 |
| Corn starch | 30.0 |
| Lactose | 155.0 |

The mixture and capsules, containing 0.2 g. thereof, are prepared as described in Example 12.

*Example 15*

Tablets containing 0.015 g. each of trans-cinnamyl-guanidine sulfate are prepared as follows (for 1,000 tablets):

| Ingredients: | G. |
|---|---|
| Trans-cinnamyl-guanidine sulfate | 15.0 |
| Tragacanth | 3.0 |
| Lactose | 123.0 |
| Corn starch | 7.5 |
| Magnesium stearate | 1.5 |
| Alcohol 3A, 50% q.s. | |

The tablets are prepared according to Example 13.

What is claimed is:

1. A pharmaceutical composition consisting essentially of a pharmacologically effective amount of a member selected from the group consisting of a guanidine compound of the formula:

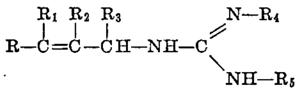

in which R is a member selected from the group consisting of phenyl,
(lower alkyl)-phenyl,
(trifluoromethyl)-phenyl,
(lower alkoxy)-phenyl,
(lower alkenyloxy)-phenyl,
(lower alkylenedioxy)-phenyl,
(lower alkoxy-carbonyloxy)-phenyl,
(lower alkanoyloxy)-phenyl,
(halogeno)-phenyl,
(lower alkanoyl)-phenyl,
(lower alkylmercapto)-phenyl,
(nitro)-phenyl,
(N,N-di-lower alkyl-amino)-phenyl,
naphthyl,
(lower alkyl)-naphthyl,
(trifluoromethyl)-naphthyl,
(lower alkoxy)-naphthyl,
(lower alkenyloxy)-naphthyl,
(lower alkylenedioxy)-naphthyl,
(lower alkoxy-carbonyloxy)-naphthyl,
(lower alkanoyloxy)-naphthyl,
(halogeno)-naphthyl,
(lower alkanoyl)-naphthyl,
(lower alkylmercapto)-naphthyl,
(nitro)-naphthyl and
(N,N-di-lower alkyl-amino)-naphthyl, and each of the groups $R_1$, $R_2$, $R_3$, $R_4$ and $R_5$ stands for a member selected from the group consisting of hydrogen and lower alkyl, and a pharmaceutically acceptable, non-toxic acid addition salt thereof, as the pharmacologically active ingredient, and together with a pharmaceutically acceptable carrier.

2. A pharmaceutical composition consisting essentially of from about 1 percent to at most 50 percent of a member selected from the group consisting of a guanidine compound of the formula

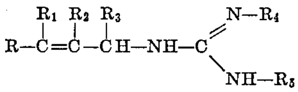

in which R is a member selected from the group consisting of phenyl,
(lower alkyl)-phenyl,
(trifluoromethyl)-phenyl,
(lower alkoxy)-phenyl,
(lower alkenyloxy)-phenyl,
(lower alkylenedioxy)-phenyl,
(lower alkoxy-carbonyloxy)-phenyl,
(lower alkanoyloxy)-phenyl,
(halogeno)-phenyl,
(lower alkanoyl)-phenyl,
(lower alkylmercapto)-phenyl,
(nitro)-phenyl,
(N,N-di-lower alkyl-amino)-phenyl,
naphthyl,
(lower alkyl)-naphthyl,
(trifluoromethyl)-naphthyl,
(lower alkoxy)-naphthyl,
(lower alkenyloxy)-naphthyl,
(lower alkylenedioxy)-naphthyl,
(lower alkoxy-carbonyloxy)-naphthyl,
(lower alkanoyloxy)-naphthyl,
(halogeno)-naphthyl,
(lower alkanoyl)-naphthyl,
(lower alkylmercapto)-naphthyl,
(nitro)-naphthyl and
(N,N-di-lower alkyl-amino)-naphthyl, and each of the groups $R_1$, $R_2$, $R_3$, $R_4$ and $R_5$ stands for a member selected from the group consisting of hydrogen and lower alkyl, and a pharmaceutically acceptable, non-toxic acid addition salt thereof, as the pharmacologically active ingredient, together with a pharmaceutically acceptable carrier.

3. A pharmaceutical composition consisting essentially of from about 1 percent to at most 50 percent of a pharmaceutically acceptable, non-toxic acid addition salt of a compound of the formula:

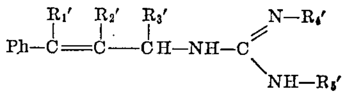

in which Ph stands for a member selected from the group consisting of phenyl, (lower alkyl)-phenyl, (lower alkoxy)-phenyl, (halogeno)-phenyl and (trifluoromethyl)-phenyl, each of the groups $R_1'$, $R_2'$, and $R_3'$ is a member selected from the group consisting of hydrogen and methyl, and each of the groups $R_4'$ and $R_5'$ is a member selected from the group consisting of hydrogen and lower alkyl, as the pharmacologically active ingredient, together with a pharmaceutically acceptable carrier.

4. A pharmaceutical composition consisting essentially of from about 1 percent to at most 50 percent of a pharmaceutically acceptable, non-toxic acid addition salt of a compound of the formula

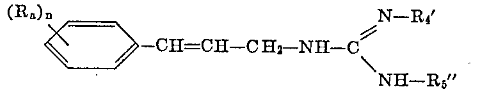

in which $R_a$ stands for a member selected from the group consisting of hydrogen, lower alkyl, lower alkoxy and halogeno, the letter *n* stands for an integer selected from the group consisting of 1, 2 and 3, and each of the groups $R_4'$ and $R_5''$ is a member selected from the group consisting of hydrogen and lower alkyl, as the pharmacologically active ingredient, together with a pharmaceutically acceptable carrier.

5. A pharmaceutical composition consisting essentially of from about 1 percent to at most 50 percent of a pharmaceutically acceptable, non-toxic acid addition salt of cinnamyl-guanidine having the formula

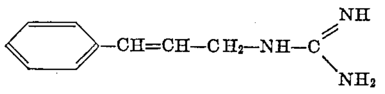

as the pharmacologically active ingredient, together with a pharmacologically acceptable carrier.

6. A pharmaceutical composition consisting essentially of a pharmacologically effective amount of a member selected from the group consisting of cis-cinnamyl-guanidine having the formula

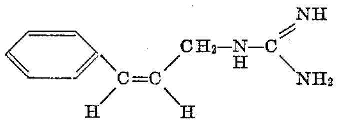

and a pharmaceutically acceptable, non-toxic acid addition salt thereof, as the pharmacologically active ingredient, together with a pharmaceutically acceptable carrier.

7. A pharmaceutical composition consisting essentially or from about 1 percent to at most 50 percent of a member selected from the group consisting of cis-cinnamyl-guanidine having the formula

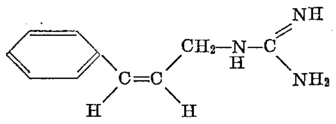

and a pharmaceutically acceptable, non-toxic acid addition salt thereof, as the pharmacologically active ingredient, together with a pharmaceutically acceptable carrier.

8. A pharmaceutical composition consisting essentially of from about 1 percent to at most 50 percent of a pharmaceutically acceptable, non-toxic acid addition salt of ciscinnamyl-guanidine having the formula

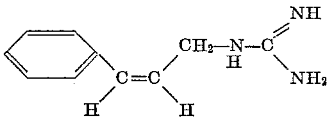

as the pharmacologically active ingredient, together with a pharmaceutically acceptable carrier.

References Cited by the Examiner

UNITED STATES PATENTS

| | | | |
|---|---|---|---|
| 2,545,423 | 3/1951 | Duerr | 260—564 X |
| 2,783,276 | 2/1957 | Boatright et al. | 260—564 |
| 2,845,459 | 7/1958 | Lecher et al. | 260—564 |
| 2,894,972 | 7/1959 | Bloom et al. | 260—295 |
| 2,897,236 | 7/1959 | Moss | 260—570.5 |
| 2,910,403 | 10/1959 | Brendel et al. | 167—65 |
| 2,971,001 | 2/1961 | Palopoli et al. | 260—294.7 |
| 2,981,741 | 4/1961 | Buckwalter et al. | 260—565 X |
| 2,987,442 | 6/1961 | McLean et al. | 167—65 |
| 3,081,230 | 3/1963 | Weinstock et al. | 167—65 |
| 3,118,941 | 1/1964 | Swett et al. | 260—570.7 |

OTHER REFERENCES

Coleman et al., J.A.C.S., vol. 58, pages 27–28 (1936). Gensler et al., J.A.C.S., vol. 77, pages 3262–3264 (1955). Harwood, Chem. Abs., vol. 27, p. 1676 (1933). Kashelikar et al., J.A.C.S., vol. 82, pages 4930–4931 (1960). Lund, Acta Chim. Scand., vol. 13, pages 249–267 (1959). Lutz et al., J. Org. Chem., vol. 12, pages 96–107 (1947). Posner, Ber. Deut. Chem., vol. 26, pages 1856–1855 (1893).

JULIAN S. LEVITT, *Primary Examiner.*

CHARLES B. PARKER, FLOYD D. HIGEL, MARTIN J. COHEN, *Assistant Examiners.*